(12) United States Patent (10) Patent No.: US 10,769,125 B2
Chen et al. (45) Date of Patent: Sep. 8, 2020

(54) ORDERING RECORDS FOR TIMED META-DATA GENERATION IN A BLOCKED RECORD ENVIRONMENT

(71) Applicant: International Business Machines Corporation, Armonk, NY (US)

(72) Inventors: Colin D. Chen, Poughkeepsie, NY (US); Brian D. Keuling, Poughkeepsie, NY (US); Anthony T. Sofia, Highland, NY (US)

(73) Assignee: International Business Machines Corporation, Armonk, NY (US)

(*) Notice: Subject to any disclaimer, the term of this patent is extended or adjusted under 35 U.S.C. 154(b) by 664 days.

(21) Appl. No.: 14/735,212

(22) Filed: Jun. 10, 2015

(65) Prior Publication Data

US 2016/0364463 A1 Dec. 15, 2016

(51) Int. Cl.
*G06F 7/00* (2006.01)
*G06F 16/22* (2019.01)

(52) U.S. Cl.
CPC .................................. *G06F 16/22* (2019.01)

(58) Field of Classification Search
CPC ............................................... G06F 17/30964
USPC ........................................ 707/722, 737, 758
See application file for complete search history.

(56) References Cited

U.S. PATENT DOCUMENTS

| | | | |
|---|---|---|---|
| 6,732,124 B1 | 5/2004 | Koseki et al. | |
| 7,444,360 B2 | 10/2008 | Frondozo et al. | |
| 7,831,574 B2* | 11/2010 | Pareek | G06F 16/254 707/703 |
| 8,532,383 B1* | 9/2013 | Thakkar | G06F 16/285 382/173 |
| 2004/0243672 A1* | 12/2004 | Markki | H04L 67/1068 709/204 |
| 2008/0195621 A1* | 8/2008 | Tedesco | H04L 63/08 707/707 |
| 2010/0036861 A1 | 2/2010 | Srihari et al. | |
| 2011/0307447 A1* | 12/2011 | Sabaa | G06F 16/24556 707/637 |
| 2012/0221639 A1* | 8/2012 | Mallet | G06F 16/285 709/204 |
| 2013/0006976 A1* | 1/2013 | Megler | G06F 16/248 707/725 |
| 2013/0203397 A1* | 8/2013 | Vidal | H04M 1/677 455/418 |
| 2013/0340080 A1* | 12/2013 | Gostev | H04L 63/1433 726/24 |

(Continued)

OTHER PUBLICATIONS

Symington, S.; "Delay-Tolerant Networking Metadata Extension Block (RFC6258)"; An IP.com Prior Art Database Technical Disclosure; IP.com No. 000207331; May 1, 2011; pp. 1-21.

(Continued)

*Primary Examiner* — Alexandria Y Bromell
(74) *Attorney, Agent, or Firm* — Alexa L. Ashworth; Brian M. Restauro

(57) ABSTRACT

Embodiments of the present invention provide a method, computer program product, and computer system for ordering records in a blocked record environment. The method includes generating metadata associated with blocked records. The metadata is appended to the end of a set of blocked records. The blocked records and metadata is de-blocked and stored such that the metadata is grouped with its corresponding records.

15 Claims, 3 Drawing Sheets

(56) References Cited

U.S. PATENT DOCUMENTS

2014/0279920 A1* 9/2014 Madhavarapu ..... G06F 11/1458
707/649
2015/0039706 A1* 2/2015 Zilmer ................... H04L 51/26
709/206

OTHER PUBLICATIONS

Weil, Sage; "Reliable, Scalable, and High-Performance Distributed Storage: Distributed Metadata Management"; An IP.com Prior Art Database Technical Disclosure; IP.com No. 000234959; Feb. 19, 2014; pp. 1-9.

* cited by examiner

PHYSICAL LAYOUT
(IN STORAGE)

LOGICAL LAYOUT
(BY TIMESTAMP)

ORDERING RECORDS FOR TIMED META-DATA GENERATION IN A BLOCKED RECORD ENVIRONMENT

BACKGROUND OF THE INVENTION

The present invention relates generally to the field of record management, and more particularly to ordering generated metadata with blocked records so as to be re-associated at a later time.

In a recording record system, for example a logging system for events occurring within an operating system, individual records are commonly provided to a component for management. This component, or record management facility, is responsible for accumulating records from different system components, storing the accumulated records to some media, and retrieving the stored records at some later time based on selection criteria.

SUMMARY

A method, computer program product, and computer system for ordering records comprising: blocking, by one or more computer processors, one or more records; storing, by one or more computer processors, the one or more blocked records as a set of records; generating, by one or more computer processors, a plurality of metadata associated with the one or more blocked records; adding, by one or more computer processors, the plurality of metadata to the set of blocked records; responsive to receiving an indication to de-block the set of records and the plurality of metadata, de-blocking, by one or more computer processors, the set of records and the plurality of metadata; and storing, by one or more computer processors, the set of records and the plurality of metadata based on a criteria.

DETAILED DESCRIPTION

Metadata can be defined as some auxiliary information that is able to be generated automatically from source data. Metadata can be generated for records at a given time interval (i.e., timer driven) or as the result of some generating event that occurs past the time interval (i.e., driven by an input record). An example of metadata generation driven by an input record is scoring, which occurs when an end user gathers records immediately thereby causing metadata to be generated. However, because the generating event occurs past the time interval, the record may have already been blocked for output and thus cannot trigger metadata generation. Embodiments of the present invention provide systems and methods for generating metadata for records that are already ordered and then handles the post-process merging of this metadata back into order at a later time. Embodiments of the present invention provide efficient systems and methods for generating metadata for blocked records and merging the metadata into ordered records during the de-blocking process. This transformation is non-destructive (i.e., the original date is not modified) but additional metadata is added.

Figure 1:
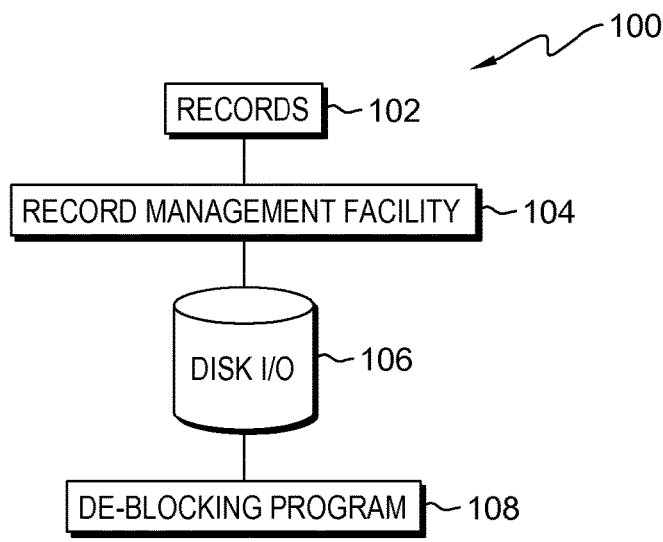
FIG. 1 is a functional block diagram illustrating a records ordering system environment, in accordance with an embodiment of the present invention.

The present invention will now be described in detail with reference to the figures. FIG. 1 is a functional block diagram illustrating a records ordering system environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, environment 100 includes records 102, record management facility 104, disk input/output (I/O) 106, and de-blocking program 108.

Records 102 represents one or more records, with each record representing a collection of attributes that describe a real-world entity. A record consists of fields, with each field describing an attribute (a characteristic or quality) of the entity (object, person, place, or event).

Record management facility 104 consolidates records previously stored in separate files into a common pool of data that provides data for many applications. Record management facility 104 performs a preprocessing step called blocking, which relies on fixed-sized blocks of memory to prepare records 102 before committing them to attached storage via I/O disk 106. Blocking comprises writing several records as a contiguous block. Blocking increases the amount of data that may be stored because there are fewer inter-block gaps. De-blocking comprises returning blocked records back to the original state of storage.

Disk I/O 106 is any operation, program, or device that transfers data to or from a computer. Disk I/O 106 is capable of writing records to an attached storage, and reading records stored in the attached storage. In this exemplary embodiment, disk I/O 106 blocks records 102 and writes the blocked records 102 to an attached storage.

De-blocking program 108 handles generating metadata for records 102 that are already blocked and after de-blocking, merges this metadata into logical order with corresponding records 102. In general, de-blocking puts the records back into the original form. In this exemplary embodiment, de-blocking program 108 provides a method of ordering records 102, such that metadata that is generated for blocked records 102 can be merged with its corresponding records 102 after de-blocking. De-blocking program 108 can generally include any software capable of generating metadata for blocked records 102, de-blocking records 102, and re-ordering records 102 such that generated metadata is merged with its corresponding records 102.

Figure 2:
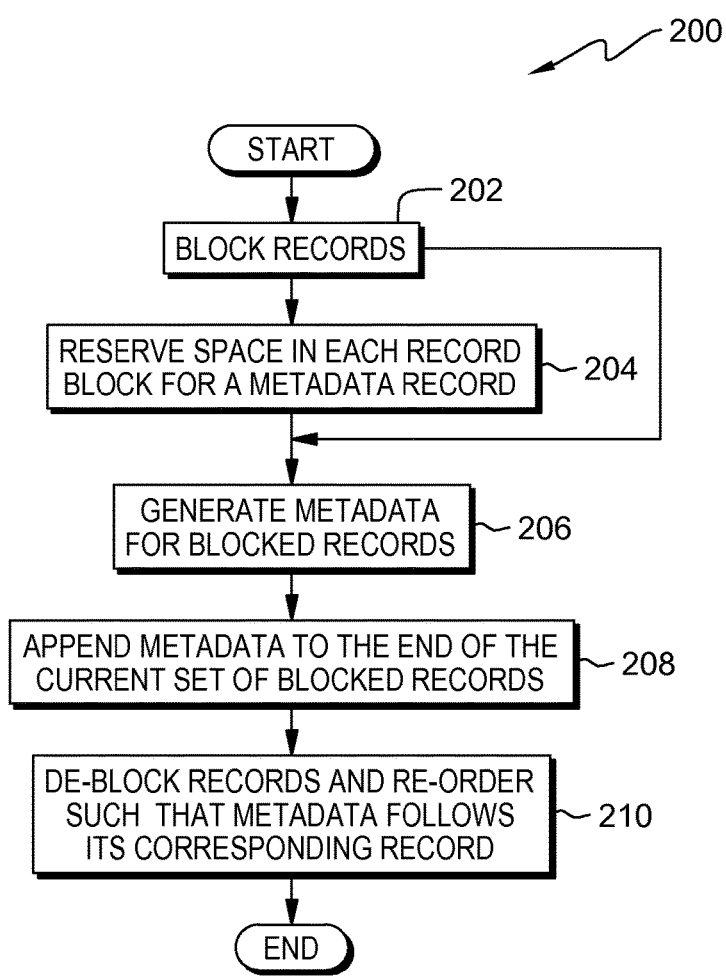
FIG. 2 is a flowchart depicting operational steps for a records ordering system, in accordance with an embodiment of the present invention.

FIG. 2 is a flowchart depicting operational steps of records ordering system 200, in accordance with an embodiment of the present invention.

In step 202, records ordering system 200 blocks records 102 via record management facility 104. In this exemplary embodiment, records 102 are blocked to optimize available storage. Blocked records 102 are written to attached storage via disk I/O 106. For example, files 1, 2, and 3 are rarely used and haven't been accessed in a period of time. Record management facility 104 blocks files 1, 2, and 3 and writes them to attached storage via disk I/O 106 to free up available storage. Blocked files 1, 2, and 3 are written to attached storage in fixed size blocks, or record blocks (explained in greater detail with respect to FIGS. 3A and 3B).

In step 204, records ordering system 200 reserves space in each record block for a metadata record. In this exemplary embodiment, step 204 is an option to records ordering system 200 and may or may not be included. For example, if it is preferred that records ordering system 200 does not reserve space in each record block for a metadata record (in an effort to save available storage), then step 204 is skipped and in step 206, records ordering system 200 generates metadata for a blocked record. In the event that it is preferred that records ordering system does reserve space in each record block, a new block header may be reserved in each record block such that the metadata generation has guaranteed space available or it communicates to de-blocking program 108 another block that must be read to acquire the metadata. This header will contain an indication as to where the metadata for this record group can be found in the current record block or in a subsequent record block. The timestamp of the newly generated metadata will be altered such that the metadata will follow logically from the records to which it applies.

Figure 3A:
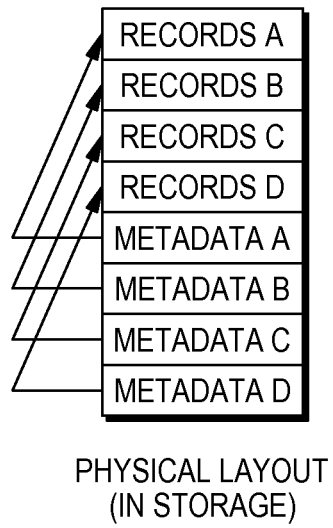
FIG. 3A is a diagram depicting an example of records physically ordered in storage, in accordance with an embodiment of the present invention.

In step 206, records ordering system 200 generates metadata for blocked records 102. In this exemplary embodiment, newly generated metadata is to be grouped together with corresponding blocked records 102 after de-blocking. For example, files 1, 2, and 3 are blocked and written to attached storage as record block A, record block B, record block C, and record block D, as shown in FIG. 3A.

In step 208, records ordering system 200 appends metadata to the end of the current set of blocked records or subsequent set of blocked records. In this exemplary embodiment, when no space is reserved in each record block for a metadata record (skip over step 204), metadata generated for blocked records will be appended to the end of the current set of blocked records. For example, metadata A generated for record block A will be physically stored after record block D, which is the end of the current set of blocked records (see FIG. 3A). It should be appreciated that in the case where step 204 is applied, and records ordering system 200 reserves space in each record block for a metadata record, metadata A will be added to the reserved space in record block A.

In step 210, records ordering system 200 de-blocks records 102 via de-blocking program 108 and re-orders records 102 such that the newly generated metadata follows its corresponding records 102. In this exemplary embodiment, records ordering system 200 re-orders records and metadata from the physical layout (depicted in FIG. 3A) to the logical layout (depicted in FIG. 3B) by some physical characteristic, such as timestamp. For example, de-blocking program 108 de-blocks records 102 and re-orders metadata A, B, C, and D to follow record blocks A, B, C, and D respectively (see FIG. 3B).

Accordingly, by performing the operational steps of FIG. 2, records can be reordered such that metadata generated for blocked records logically follow its corresponding records.

Figure 3B:
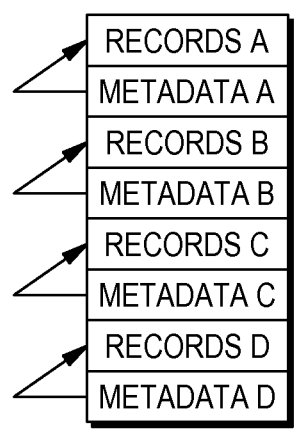
FIG. 3B is a diagram depicting an example of records logically ordered after de-blocking, in accordance with an embodiment of the present invention.
Figure 4:
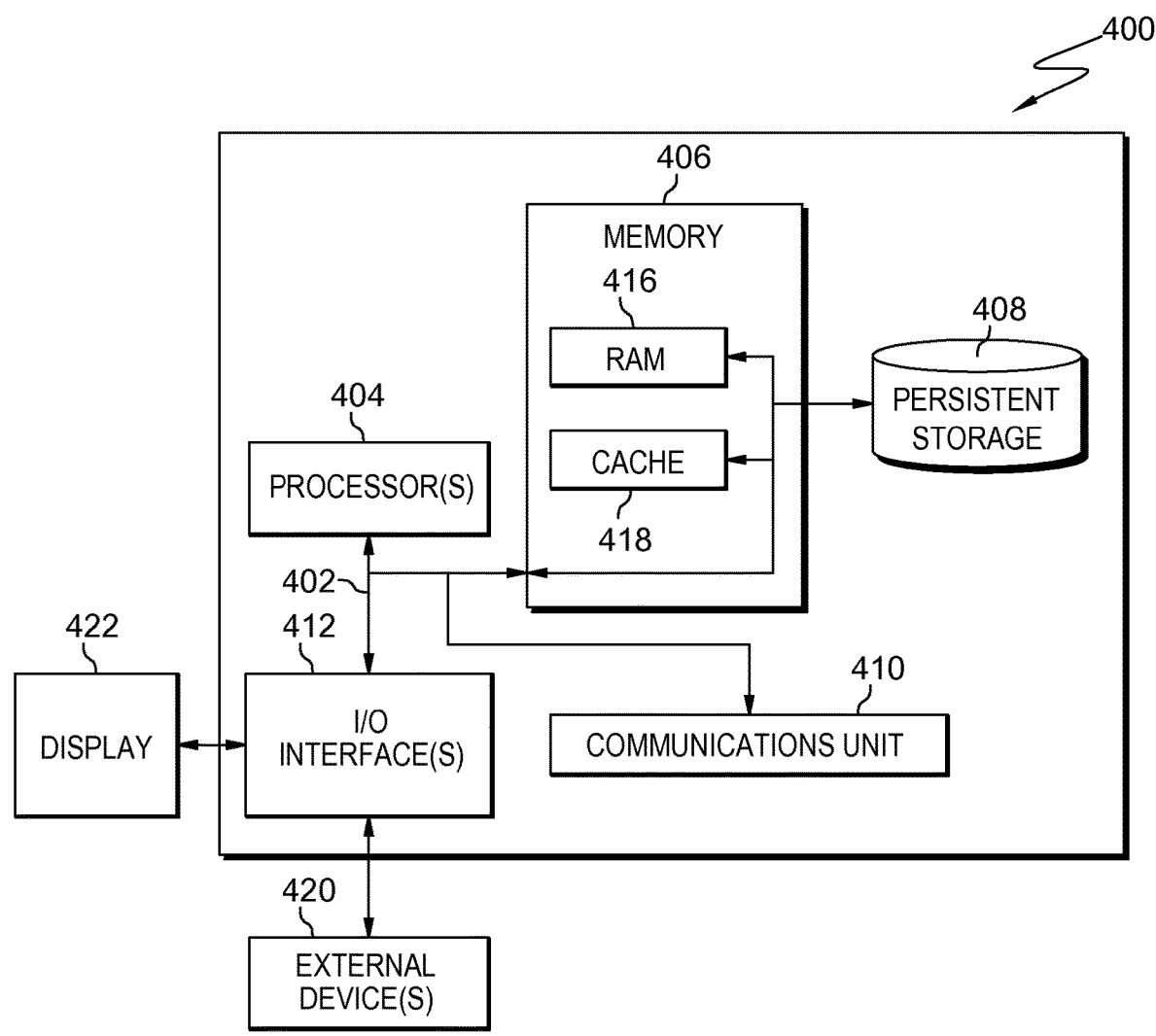
FIG. 4 is a block diagram of internal and external components of a computer system, in accordance with an embodiment of the present invention.

FIG. 3A is a diagram depicting example records as they are physically ordered in storage, in accordance with an embodiment of the present invention. FIG. 3B is a diagram depicting example records as they are logically ordered after de-blocking, in accordance with an embodiment of the present invention. It should be appreciated that FIGS. 3A and 3B provide only an illustration of one implementation and does not imply any limitations with regard to the environments in which different embodiments may be implemented. In this exemplary embodiment, metadata that is generated for record blocks (step 206) is appended to the end of the current set of blocked records (step 208). For example, metadata A, B, C, and D is appended to the end of the current set of blocked records, record blocks A, B, C, and D, and is physically stored after record block D as shown in FIG. 3A. In step 210, de-blocking program 108 de-blocks records 102 and re-orders records 102 and metadata in a logical layout. For example, metadata A is associated with record block A, metadata B is associated with record block B, metadata C is associated with record block C, and metadata D is associated with record block D. Metadata A is ordered to follow record block A, metadata B is ordered to follow record block B, metadata C is ordered to follow record block C, and metadata D is ordered to follow record block D, respectively. The re-ordering process results in the logical layout depicted in FIG. 3B.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for ordering records comprising:
blocking, by one or more processors, one or more records in a physical layout in a sequential manner;
determining, by one or more processors, that one or more additional records have criteria that belong to a group of blocked one or more records stored in the physical layout;
reserving space in the group of blocked one or more records for metadata associated with the additional one or more records;
responsive to determining that one or more additional records have criteria that belong the group of blocked records, generating, by one or more processors, metadata that is associated with the additional one or more records not stored in the group of blocked one or more records; and
reorganizing, by one or more computer processors, the physical layout of the group of blocked one or more records into a logical layout that orders the group of blocked one or more records with the respective metadata in a sequential manner based on timestamps of the generated metadata and a matching of a record to media type and physical characteristics of the generated metadata to media types and physical characteristics of respective one or more records in the group of blocked records by:
de-blocking the group of blocked records,
ordering the de-blocked group by writing the respective metadata that is associated with the one or more records that were not stored in the group in the reserved space of the blocked records by timestamp, media type, and physical characteristics of the respective metadata, and
blocking the ordered group.

2. The method of claim 1, further comprising:
blocking one or more records into a group by:
receiving, by a record management facility, one or more records, wherein the one or more records are grouped to fixed size blocks; and
writing, by the record management facility, one or more fixed size blocks to an attached storage.

3. The method of claim 1, wherein de-blocking said set of records and respective metadata comprises:

matching, by one or more computer processors, metadata with a corresponding record, based on the criteria; and
generating, by one or more computer processors, a storage layout such that the metadata is grouped with an associated record, based on the criteria.

4. The method of claim 1, further comprising:
reserving, by one or more computer processors, a portion of storage within the group of blocked records for the generated metadata.

5. The method of claim 4, wherein said reserved portion of storage within the blocked group of records comprises information detailing a location of respective metadata.

6. A computer program product comprising:
a computer readable storage medium and program instructions stored on the computer readable storage medium, the program instructions comprising:
program instructions to block one or more records in a physical layout in a sequential manner;
program instructions to determine that one or more additional records have criteria that belong to a group of blocked one or more records stored in the physical layout;
reserving space in the group of blocked one or more records for metadata associated with the additional one or more records;
program instructions to reserve space in the group of blocked one or more records for metadata associated with the additional one or more records;
program instructions to, responsive to determining that one or more additional records have criteria that belong the group of blocked records, generating, by one or more processors, metadata that is associated with the additional one or more records not stored in the group of blocked one or more records; and
program instructions to reorganize, the physical layout of the group of blocked one or more records into a logical layout that orders the group of blocked one or more records with the respective metadata in a sequential manner based on timestamps of the generated metadata and a matching of a record to media type and physical characteristics of the generated metadata to media types and physical characteristics of respective one or more records in the group of blocked records by:
de-blocking the group of blocked records,
ordering the de-blocked group by writing the respective metadata that is associated with the one or more records that were not stored in the group in the reserved space of the blocked records by timestamp, media type, and physical characteristics of the respective metadata, and
blocking the ordered group.

7. The computer program product of claim 6, further comprising:
program instructions to block one or more records comprising:
program instructions to receive one or more records, wherein the one or more records are grouped to fixed size blocks; and
program instructions to write one or more fixed size blocks to an attached storage.

8. The computer program product of claim 6, wherein the program instructions to de-block said set of records and said metadata comprise:
program instructions to match the metadata with a corresponding record, based on the criteria; and
program instructions to generate a storage layout such that the metadata is grouped with and associated record, based on the criteria.

9. The computer program product of claim 6, further comprising:
   program instructions to reserve a portion of storage within the group of blocked records for the metadata.

10. The computer program product of claim 9, wherein said reserved portion of storage within the group of records comprises information detailing a location of the metadata.

11. A computer system comprising:
   one or more computer processors;
   one or more computer readable storage media;
   program instructions stored on the computer readable storage media for execution by at least one of the one or more computer processors, the program instructions comprising:
   program instructions to block one or more records in a physical layout in a sequential manner;
   program instructions to determine that one or more additional records have criteria that belong to a group of blocked one or more records stored in the physical layout;
   reserving space in the group of blocked one or more records for metadata associated with the additional one or more records;
   program instructions to reserve space in the group of blocked one or more records for metadata associated with the additional one or more records;
   program instructions to, responsive to determining that one or more additional records have criteria that belong the group of blocked records, generating, by one or more processors, metadata that is associated with the additional one or more records not stored in the group of blocked one or more records; and
   program instructions to reorganize, the physical layout of the group of blocked one or more records into a logical layout that orders the group of blocked one or more records with the respective metadata in a sequential manner based on timestamps of the generated metadata and a matching of a record to media type and physical characteristics of the generated metadata to media types and physical characteristics of respective one or more records in the group of blocked records by:
   de-blocking the group of blocked records,
   ordering the de-blocked group by writing the respective metadata that is associated with the one or more records that were not stored in the group in the reserved space of the blocked records by timestamp, media type, and physical characteristics of the respective metadata, and
   blocking the ordered group.

12. The computer system of claim 11, further comprising:
   program instructions to block one or more records comprising:
      program instructions to receive one or more records, wherein the one or more records are grouped to fixed size blocks; and
      program instructions to write one or more fixed size blocks to an attached storage.

13. The computer system of claim 11, wherein the program instructions to de-block said set of records and said metadata comprise:
   program instructions to match the metadata with a corresponding record, based on the criteria; and
   program instructions to generate a storage layout such that the metadata is grouped with an associated record, based on the criteria.

14. The computer system of claim 11, further comprising:
   program instructions to reserve a portion of storage within the group of records for the metadata.

15. The computer system of claim 14, wherein said reserved portion of storage within the group of records comprises information detailing a location of the metadata.

* * * * *